Jan. 1, 1929.

A. R. CULVER 1,696,904

RETAINING CLIP FOR AUTOMOBILE HEADLIGHT INDICATORS

Filed Aug. 23, 1926

INVENTOR.
Ansel R. Culver.
BY
ATTORNEY.

Patented Jan. 1, 1929.

1,696,904

UNITED STATES PATENT OFFICE.

ANSEL RAY CULVER, OF BRIDGEPORT, CONNECTICUT, ASSIGNOR TO JAMES H. HAYES, OF NEW YORK, N. Y.

RETAINING CLIP FOR AUTOMOBILE HEADLIGHT INDICATORS.

Application filed August 23, 1926. Serial No. 130,822.

The present invention relates to an improved retaining clip for automobile headlight indicators, particularly of the type disclosed in the U. S. patent to Daniel H. Deery, for indicators for automobile lamps, #1,538,176, dated May 19, 1925, in which a light conducting column of glass is retained in front of the lens with its light emitting end disposed beyond the periphery of the lamp and disposed reversely to the normal lamp rays, so as to indicate to the driver whether or not the lamp is lighted. An object of the invention is to provide a clip for attaching such indicating device adapted to fit various types and sizes of lamps.

It is particularly proposed to provide a clip which will be applicable to head lamp rims of varying depths, and in which the peripheral margin of the lens projects into the rim to a greater or less extent, and which will securely and reliably retain the indicator in cooperative relation with the rim. The use of this universal clip, adapted to fit the lamps of practically all makes of cars, will obviously minimize jobbers' and dealers' stocks, simplify and economize manufacturing, and add greatly to the utility of the device.

Other objects are to provide a clip formed of one piece of sheet metal, of compact form, of sufficient strength and resiliency to solidly retain the indicator device in place, and which will not mar the lamp structure, or require cutting or filing of the lamp rim to attach it. The clip, furthermore, obviates any chance of fracturing the head light lens.

With the above and other objects in view, an embodiment of the invention is shown in the accompanying drawings, and this embodiment will be hereinafter more fully described with reference thereto, and the invention will be finally pointed out in the claim.

In the drawings:—

Similar reference characters indicate corresponding parts throughout the several figures of the drawings.

Figure 1:
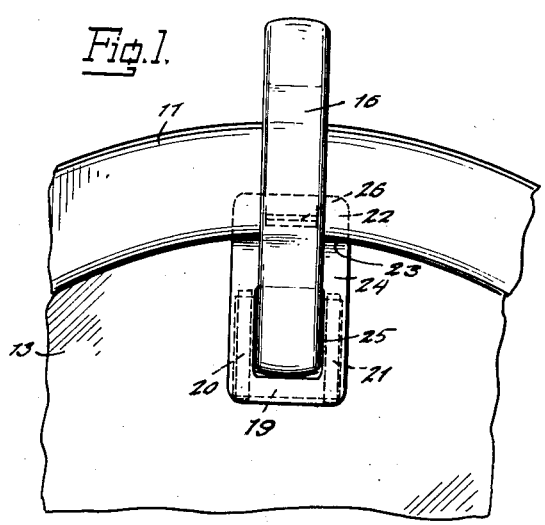
Fig. 1 is a front elevation of the upper portion of an automobile head-lamp provided with an indicator and retaining clip, according to the present embodiment of the invention.
Figure 2:
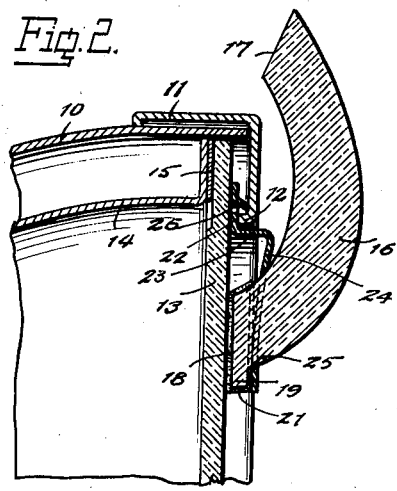
Fig. 2 is a vertical sectional view thereof.
Figure 3:
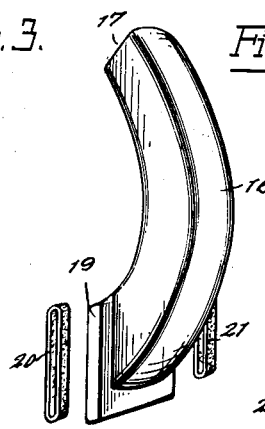
Fig. 3 is a perspective view from the front of one of the indicating devices, the rubber washers employed thereon being shown in separated relation.
Figure 4:
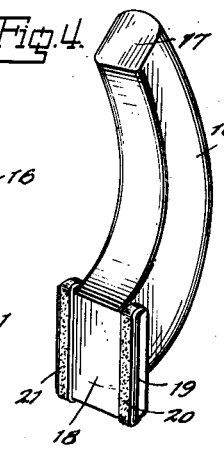
Fig. 4 is a perspective view from the rear of one of the indicating devices, the rubber washers being in place thereon.
Figure 5:
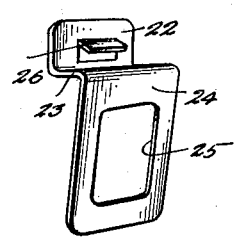
Fig. 5 is a perspective view of the retaining clip.
Figure 6:
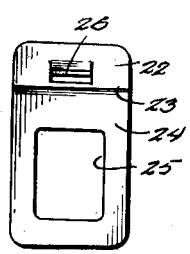
Fig. 6 is a front elevation thereof.
Figure 7:
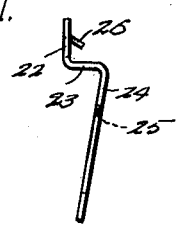
Fig. 7 is a side elevation of the same.

Referring to the drawings, the head-lamp shown therein, and which is of the usual type, comprises a main body 10 having a circular lens retaining rim 11, provided at its inner periphery with an inwardly bent flange 12, and secured upon the main body by bayonet joints, or the like. The rim holds in place a circular lens 13, the latter being held against the forward flanged edge of the reflector 14, a felt gasket 15 being preferably interposed between the reflector and lens.

The indicating device is secured to both head-lamps, to indicate at the rear by showing spots of light above each lamp, and which are clearly visible to the driver, whether or not the lamps are lighted, it being immediately apparent to the driver when either one or both of them are out.

The indicating device comprises a curvilinear glass column 16, provided with a flat polished lens engaging face 17 at its lower end, and a flat light indicating face 18 at its upper end adapted when the device is in place upon the lamp to be above the same and faced rearwardly toward the driver. The face 17 is preferably in a vertical plane, while the face 18 is in an inclined plane, and in the attached relation to the lamp is forwardly of the front plane of the rim 11 to permit of inward adjustment to a relatively great extent, this being desirable when the lamp rim is relatively wide. The face 18 is flanged, as at 19, for the purpose of attachment, and is adapted to be secured in place upon the lamp by means of the spring metal clip constituting the improvement of the present invention. The side portions of the flange 19 are preferably provided with rubber cushioning bands 20 and 21, which serve to protect the glass surfaces and insure a tight, non-rattling attachment relation of the indicating device.

The clip, according to the present embodiment of the invention, is blanked and pressed to shape from relatively thin spring sheet metal, and comprises an upper vertically disposed flat portion 22, a shoulder 23 bent forwardly therefrom, substantially at a right angle, and an elongated substantially rectangular portion 24 bent downwardly from the shoulder 23 at an inward inclination, and having a substantially rectangular aperture 25 therein, adapted to be engaged over the column 16 in a manner to engage the flange 18. The upper portion 22 is provided in upwardly spaced relation to the shoulder 23 with a lip or locking strut 26 blanked therefrom, and bent forwardly at an angle of substantially 30 degrees.

In order to attach the device, the lamp rim 11 is loosened sufficiently to allow insertion of the portion 22 of the clip between the rim and lens face, the flat side of said portion being engaged against the flat surface of the lens, while the flange 12 of the rim is engaged between the shoulder 23 of the clip and the lip 26, the rim being thereupon secured or clamped in place. The set of the clip is such that clamping of the rim in place springs the portion 24 and tightly presses and retains the column in place, so that constant vibration or shock will not loosen or break it. The interlocking relation between the clip and the rim prevents any slipping or relative turning of the clip, while the rectangular aperture 25 prevents turning of the column, so that the end 17 is maintained in its projected relation to the periphery of the rim.

The clip, according to my invention, is applicable to practically all types of head-lamps, irrespective of the depth of the rim, and without necessitating any change therein, so that in the sale of the devices it is only necessary to provide this single type of clip, whereas heretofore a number of different styles or sizes of clips were required to fit different lamp types and sizes.

I have illustrated and described a preferred and satisfactory embodiment of the invention, but it will be obvious that changes may be made therein, within the spirit and scope thereof, as defined in the appended claim.

Having thus described my invention, what I claim and desire to secure by Letters Patent is:—

In combination with a head-lamp and a light indicating device, said head-lamp including a casing, lens, and a rim having an inturned inner edge, an attaching clip for the indicating device comprising a portion adapted to receive and yieldably press the indicating device against the lamp lens, said portion being out of contact with the lens, a flange at the upper end of said first mentioned portion disposed below said inner edge of the rim and adapted to space said portion outwardly from the lens, a flat lens engaging portion extending upwardly from said flange and adapted to engage the lens between the same and the lamp rim, and a locking strut portion extending forwardly and downwardly from said lens engaging portion in spaced relation to said flange adapted to engage the inner side of the rim above said inturned edge thereof to retain said lens engaging portion firmly against the lens at a point inwardly of the inner edge of the brim to permit flexing of said first mentioned portion.

Signed at Bridgeport, county of Fairfield, and State of Connecticut, this 17th day of August, 1926.

ANSEL RAY CULVER.